United States Patent [19]

Austevoll

[11] Patent Number: 4,610,635

[45] Date of Patent: Sep. 9, 1986

[54] ARRANGEMENT FOR PICKING UP OBJECTS OR OIL FROM THE SEA

[76] Inventor: Wilhelm M. Austevoll, N-5395, Steinsland, Norway

[21] Appl. No.: 662,426
[22] PCT Filed: Feb. 2, 1984
[86] PCT No.: PCT/NO84/00008
 § 371 Date: Sep. 28, 1984
 § 102(e) Date: Sep. 28, 1984
[87] PCT Pub. No.: WO84/03076
 PCT Pub. Date: Aug. 16, 1984

[30] Foreign Application Priority Data

Feb. 2, 1983 [NO] Norway .................................. 830344

[51] Int. Cl.$^4$ ............................................. B63C 9/00
[52] U.S. Cl. .......................................... 441/80; 405/60
[58] Field of Search ................................... 441/80–87, 441/136; 405/52, 60, 100.5, 63; 56/8, 9

[56] References Cited

U.S. PATENT DOCUMENTS

| | | | |
|---|---|---|---|
| 600,355 | 3/1898 | Burton | 441/80 |
| 872,888 | 12/1907 | Becchi et al. | 441/80 |
| 2,486,275 | 10/1949 | Grinwald | 56/8 |
| 2,557,079 | 6/1951 | Cutri | 441/80 |
| 2,749,560 | 6/1956 | Craft | 441/86 |
| 2,985,896 | 5/1961 | Lees | 441/84 |
| 3,599,354 | 8/1971 | Larson | 56/8 |
| 3,751,887 | 8/1973 | den Herder et al. | 56/8 |

FOREIGN PATENT DOCUMENTS 2632309  1/1978  Fed. Rep. of Germany ............ 56/8

Primary Examiner—Trygve M. Blix
Assistant Examiner—Stephen P. Avila
Attorney, Agent, or Firm—McCormick, Paulding & Huber

[57] ABSTRACT

An arrangement for picking up objects (17), or collecting oil whereby it is connected to a boom, from the sea comprises a basket or container (10) which is connected to a ship (12) and which is adapted to be conveyed between a work position partially submerged in the sea and a rest position on board the ship. The basket (10) is rigidly connected to a boom (11, 18) which is rotatable about its axis so that the basket in the work position is movable in a vertical plane substantially parallel to the vessel side (12) of the ship, and which is pivotable between the work position, where it projects outwards substantially horizontally from the side of the vessel (12), and the rest position. On collecting oil there is arranged between end walls (22a, 22b) of the container, a wall (24) regulatable upwards and downwards which is arranged with its upper edge in the oil/water boundary layer for separation of the oil.

1 Claim, 6 Drawing Figures

ARRANGEMENT FOR PICKING UP OBJECTS OR OIL FROM THE SEA

The present invention relates to an arrangement for picking up objects or oil from the sea, comprising a basket or container which is connected to a ship and which is adapted to be conveyed between a work position partially submerged in the sea and a rest position on board the ship.

On picking up people from the sea it is customary to employ a basket which is suspended from a line, which is fastened to a derrick on board a ship. In heavy seas the basket will move quite independently of the ship, and it becomes difficult to achieve a satisfactory control of the basket. This renders difficult the picking up of a person who lies in the sea, and it can also be dangerous for the persons involved, who can be hit by the basket and thereby be injured.

From Norwegian Patent Specification No. 140,530 there is known an arrangement in which the basket is fastened to wires both above and below, and the possibility for control of the basket is thereby greater than in the afore-described solution. But the arrangement, which is especially designed for putting out/picking up of lifeboats and other lesser boats, is rather extensive and complicated and thereby expensive and is therefore less suitable for picking up of smaller objects, such as people.

It is known to collect oil from the surface of the ocean with the aid of so-called skimmers after the oil is surrounded by a boom, which is pulled at each end by a tug boat. In that connection there is a problem that the ship in which the skimmers are present on board must be manoeuvred along the boom and thereby drives away the oil with its slip stream.

There is thus a need for an arrangement which on picking up objects is simple to control and which is of relatively simple construction and relatively reasonable. There is also a need for an effective arrangement for collecting up oil flakes.

Such an arrangement is produced according to the present invention and is characterised in that the basket or the container is rigidly connected to a derrick which is rotatable about its axis so that the basket in the work position is movable in a vertical plane substantially parallel to the vessel side of the ship, and which is pivotable between the work position, where it projects outwards substantially horizontally from the side of the vessel, and the rest position.

The derrick consists preferably of an outer, hollow boom which is rotatable about its axis, and which the basket is connected to, and an inner boom which is coaxilly mounted within the outer boom, and which at its inner end is pivotably arranged on the deck of the ship.

The inner side of the basket must be at a certain distance from the side of the vessel so that the basket shall not strike against the side of the vessel in heavy seas. This distance shall however be the least possible in order that the object which is to be picked up from the sea shall not have the possibility of slipping between the basket and the side of the vessel, or in order that the least possible oil can flow between the side of the vessel or the container.

The invention will be further explained in the following description with reference to the accompanying drawings, where:

FIG. 2 shows a front view of the arrangement in the work position.

FIG. 3 shows a perspective view of the arrangement.

FIGS. 4-6 show the arrangement used for collecting up oil, in that

FIG. 4 shows a side view of the arrangement corresponding to FIG. 1.

FIG. 5 shows a front view of the arrangement corresponding to FIG. 2.

FIG. 6 shows a schematic plan view of a ship equipped with the arrangement together with two tug boats which pull a boom.

Figure 1:
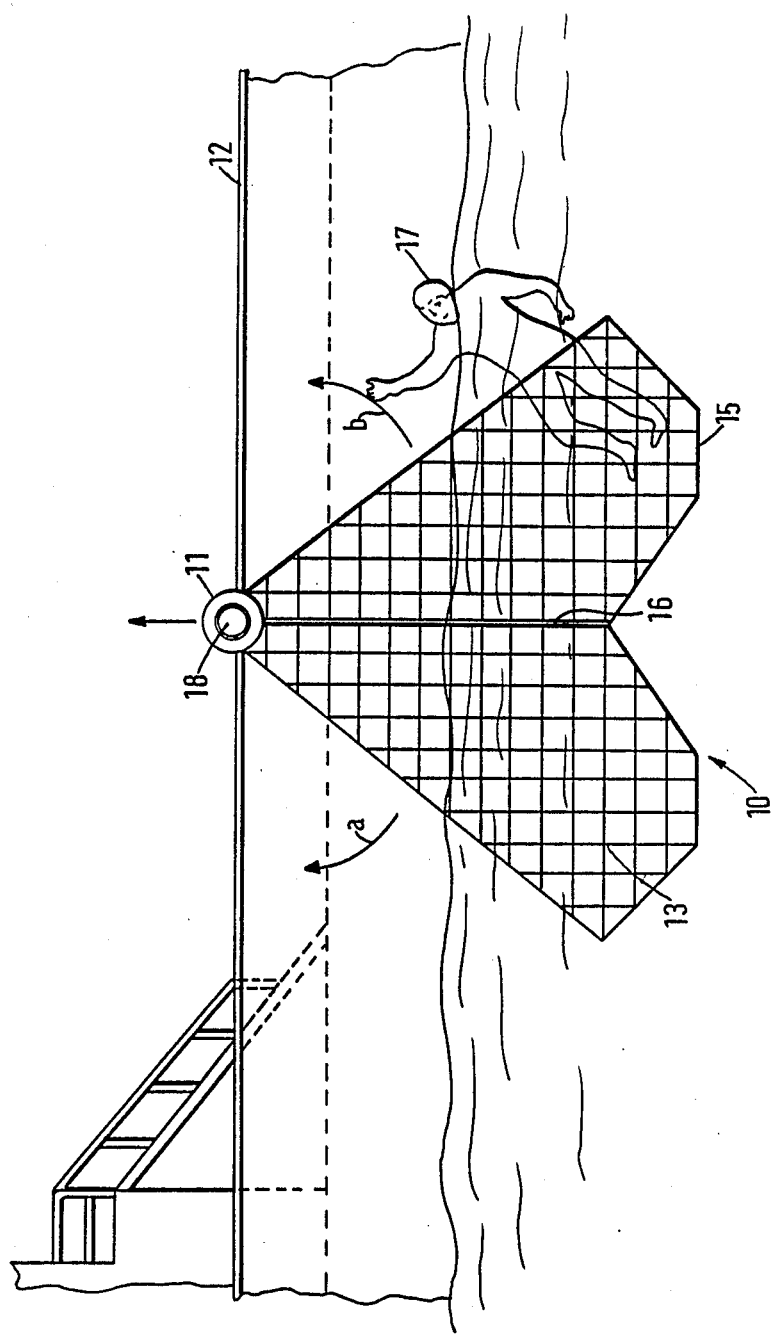
FIGS. 1-3 show the arrangement according to the invention used for picking up people, in that FIG. 1 shows a side view of the arrangement in the work position.
Figure 2:
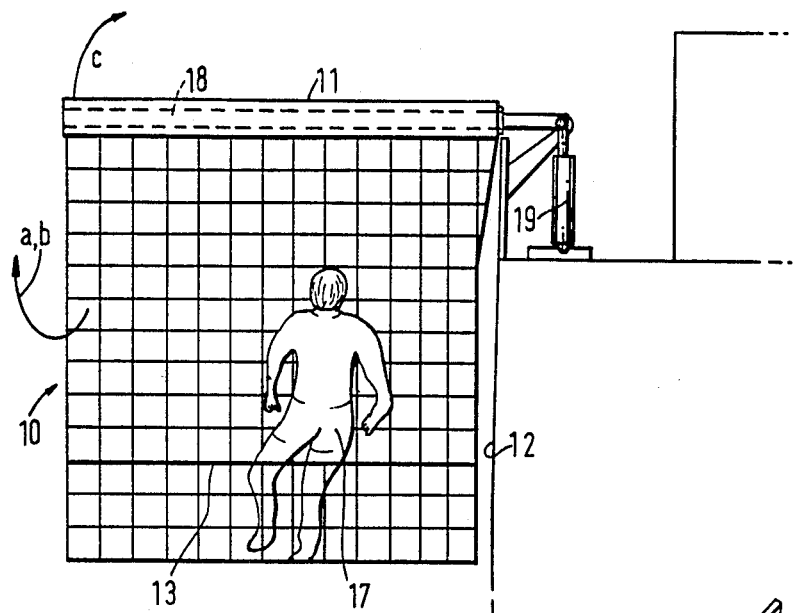
Figure 3:
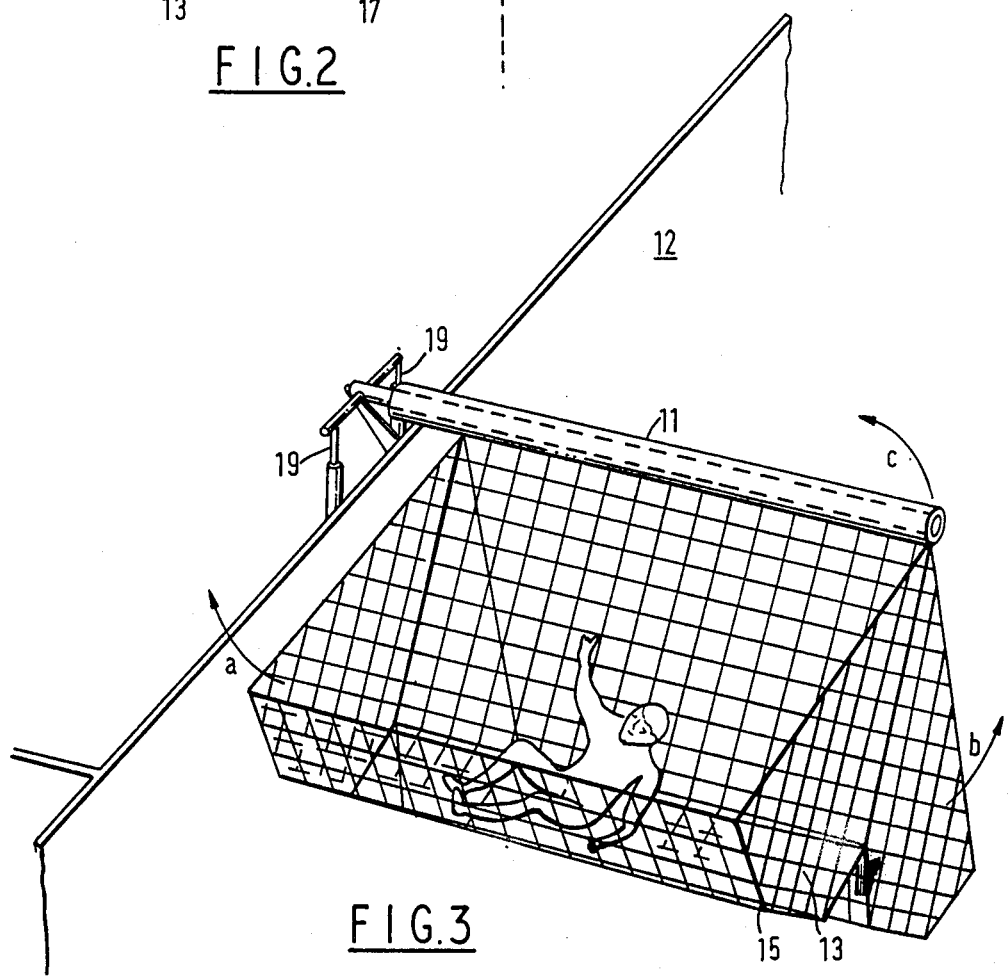

FIG. 1 shows a lifesaving basket 10 which is suspended from a boom 11, which on its side is fastened to a ship 12. The ship is usually a supply ship or a standby ship. There can be arranged one or two baskets on board a ship, depending upon what one finds appropriate in the individual case. If there are used two baskets, the one is arranged on the port side, while the other is present on the starboard side. The basket consists of a netting, for example of aluminium, or a net 13 which is stretched out over a lattice work 15 and forms the bottom and end walls of the basket. The basket is provided in the centre with a vertical wall 16, which has the task of stopping objects which come into the basket, either from the back or from the front. The basket 10 projects partly down into the sea and partly above the latter in the work position which is shown in FIG. 1. It is rigidly connected to the boom 11 which in its turn is rotatable about its axis, so that the basket can be rotated in the a and b directions of the arrows, in a vertical plane substantially parallel to the side of the vessel. The boom 11 is hollow, and within this boom there is coaxially mounted another boom 18 which in the work position of the basket projects horizontally away from the ship 12 and is pivotable between the work position and a rest position on the deck of the ship. A person 17 is taken out of the sea by means of the basket 10 in that the ship 12 is moved in the direction towards the person and the basket if necessary is turned somewhat in the a direction of the arrow (or the b direction of the arrow if the ship moves backwards) so that it will attain a position where one is sure that those persons involved are settled in the basket, after which the basket is turned in the b direction of the arrow until the wall 16 is lying substantially horizontal. Thereafter the basket is turned on board the ship 12 by swinging the boom 18 in the c direction of the arrow in an arc of about 180°, with the person lying on the wall 16 which during the whole of this swinging is substantially horizontal. The control of the basket in the a, b and c directions of the arrow is carried out from the ship. The rotation of the boom 11 and thereby of the basket 10 is effected for example by way of a gear system. The swinging of the boom 18 is effected by means of a hydraulic cylinder 19, which is arranged at the inner end of the boom 18. The cylinder 19 is in its turn arranged on a rotatable disc or the like on the deck of the ship, so that the arc which the boom 18 describes during the swinging can be controlled substantially arbitrarily.

The booms 11 and 18 can be replaced with a single boom, but this demands more complicated equipment for control of the boom movements.

Figure 4:
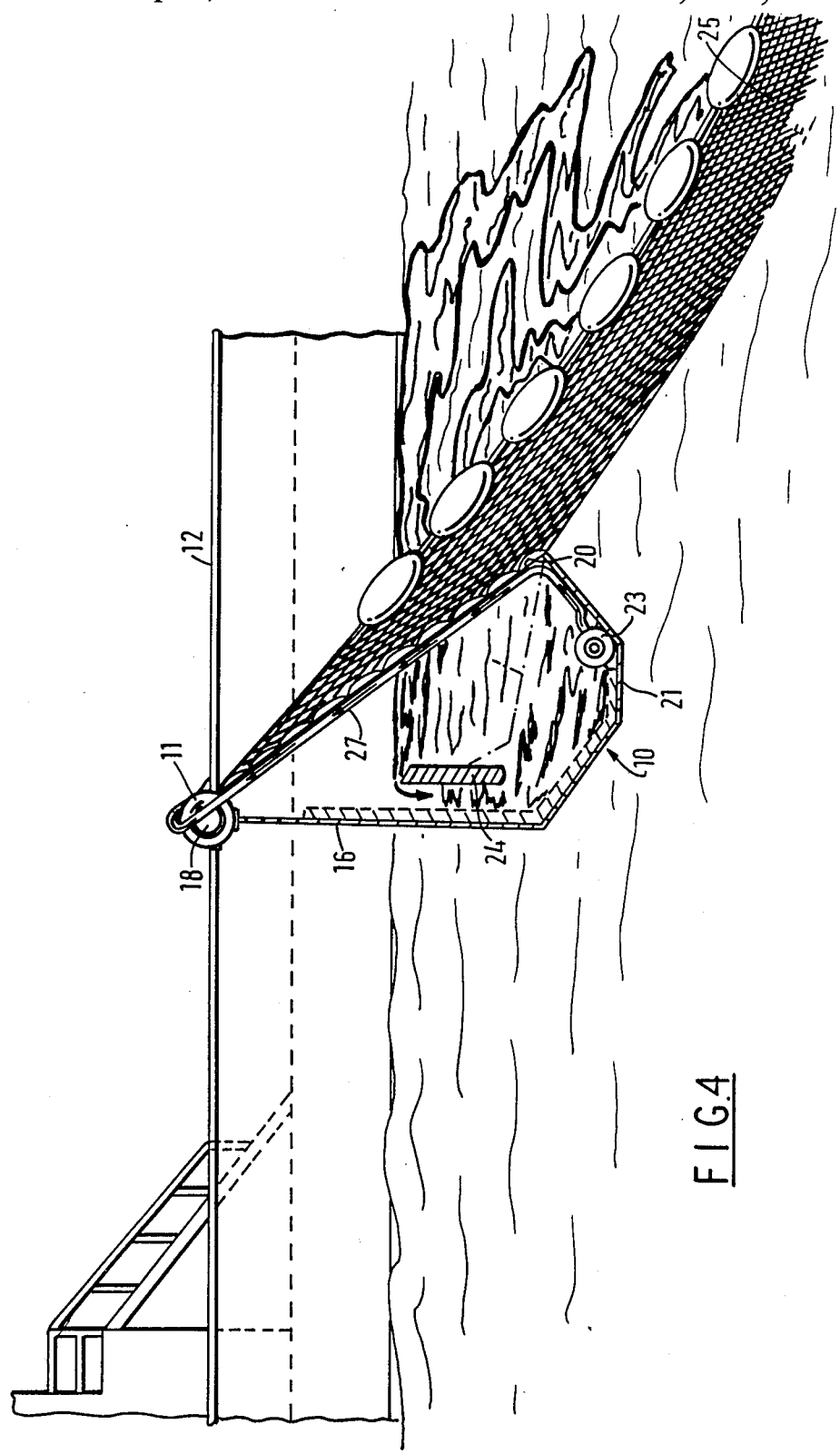
Figure 5:
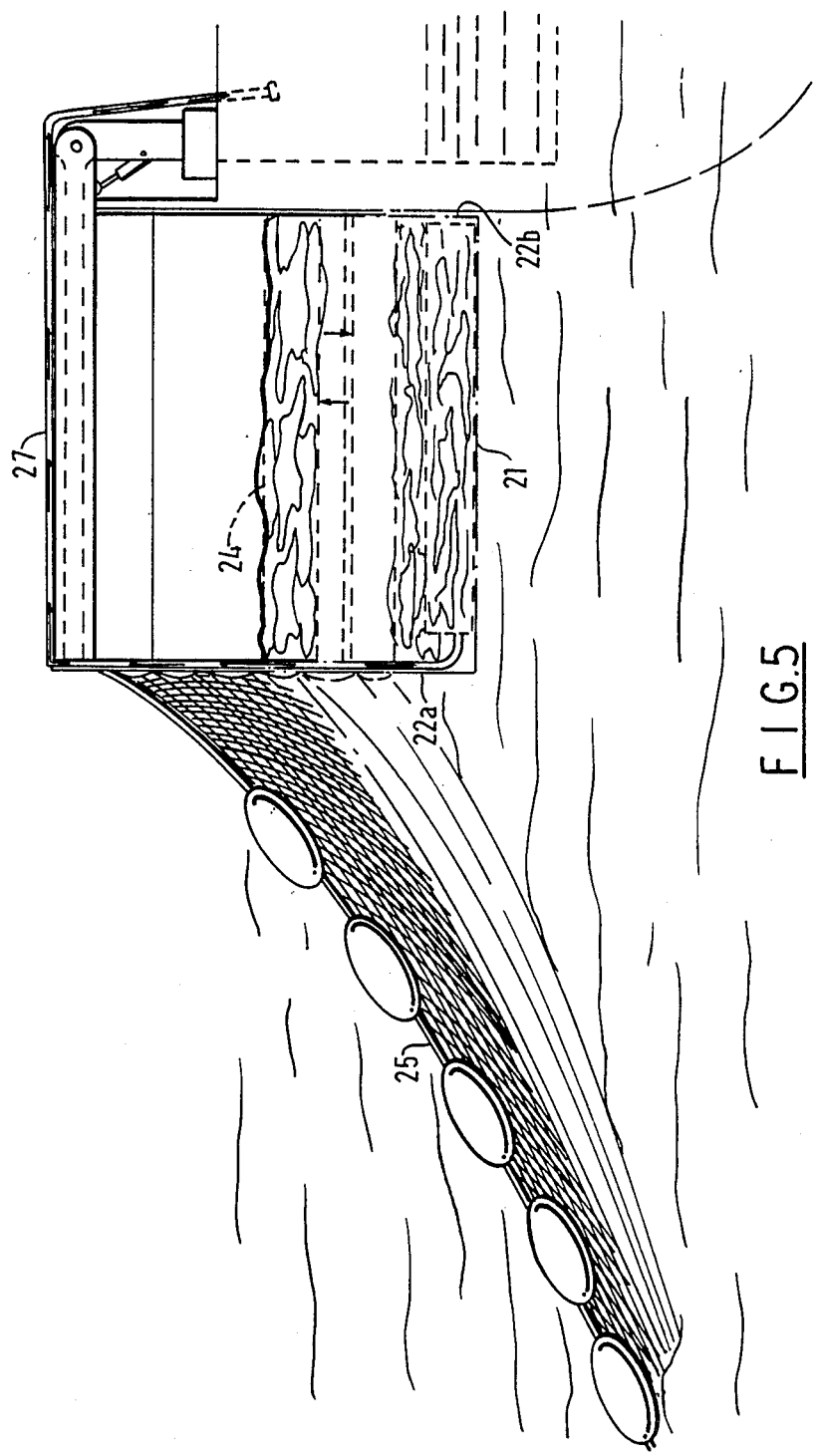

FIGS. 4 and 5 illustrate as mentioned above a side view and a front view of the arrangement respectively for collecting up oil. The basket which is employed in the picking up of people in the sea is thereby replaced with a kind of container 10 with sealed bottom 21, side walls 22, 22b and rear wall 16. The front wall 20 of the container, seen in a forward direction on the ship, is open, at least in the region of the water surface, so that an oil/water mixture can run into the container. On the bottom of the container 10 there is arranged a pump 23, which via a conduit 27 is connected to a chamber on board the ship 12. Oil or oil/water mixture which runs down towards the bottom of the container 10 is pumped on board the ship by means of the pump. In order to reduce the quantity of water which accompanies the oil on board the ship there is secured to end walls 22a, 22b of the container 10 a vertical wall 24 which is regulatable upwards and downwards. This wall 24 is adjusted so that it is present with its upper edge approximately at the level of the under side of the oil flakes, that is to say substantially at the oil/water boundary surface. To the outer end wall 22a of the container there is fastened a boom 25, and in a corresponding way there is fastened a boom to the outer end wall of the container on the opposite side.

Figure 6:
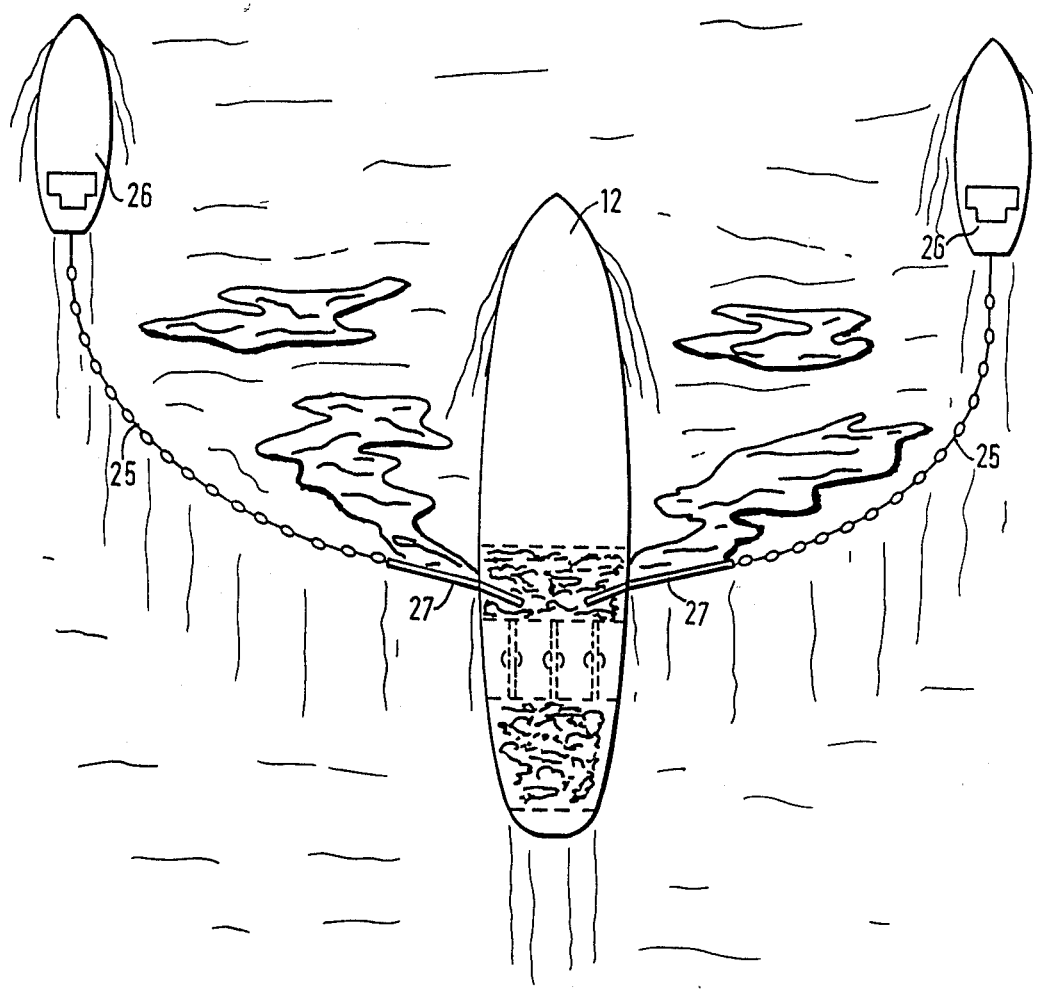

FIG. 6 shows a plan view of the ship 12 with the booms 25, which at their other ends are connected to respective tug boats 26 which pull the booms through a desired angle or desired arc relative to the ship 12, depending upon for one thing the size of the oil flake. If it is a question of collecting large quantities of oil, the oil can, after a separation from the water be pumped on board the ship 12 from the latter over to a second ship.

After completing the task, that is to say when the oil has arrived on board the ship 12, the booms 25 are uncoupled from the containers 10, and these are swung in on the deck of the ship as is described above in connection with the picking up of a person in the sea. The present arrangement makes possible a rapid and effective collection of the oil, and it is flexible in that it can be used for several purposes.

I claim:

1. In combination with a vessel having a deck structure and a longitudinally extending generally vertical sidewall between the deck structure and the vessel's water line, apparatus for retrieving objects from the sea alongside the vessel and comprising in combination:
   A. boom structure including an elongated support boom and a carrier member rotatably mounted on said support boom for rotation on the longitudinal axis of said support boom, said carrier member including a hollow outer tube provided co-axially on the free end portion of said boom,
   B. means on the vessel's deck structure for movably supporting one end of said elongated support boom, said means including a turntable having a fixed portion adapted for attachment to said deck structure and a movable base portion, rotatable on a vertical axis relative said turntable fixed portion, fluid motor means with a first part attached to said base portion and a second part attached to said boom adjacent said one movably supported end for swinging a free end portion of said boom,
   C. container means having a generaly planar rear wall, said rear wall having an upper edge supported by said carrier said container mans also having side and bottom walls defining a receptacle arranged forwardly of said rear wall, and
   D. said container means being rotatable with said carrier on said support boom such that the receptacle is swung upwardly as said carrier is so rotated at least with said support boom in its work position.

* * * * *